US012640669B2

(12) United States Patent
Arellano Aguado et al.

(10) Patent No.: US 12,640,669 B2

(45) Date of Patent: May 26, 2026

(54) METHOD FOR CONTROLLING THE OPERATION OF A WIND TURBINE AND WIND TURBINE

(71) Applicant: Siemens Gamesa Renewable Energy Innovation & Technology, S.L., Sarriguren (ES)

(72) Inventors: Jesus Arellano Aguado, Pamplona (ES); Asier Diaz de Corcuera Martinez, Vitoria (ES); Stephane Munch, Madrid (ES); Gulfer Ozcetin, Karabağlar/İzmir (AR); Pablo Vital Amuchastegui, Pamplona (ES)

(73) Assignee: Siemens Gamesa Renewable Energy Innovation & Technology, S.L., Sarriguren (ES)

( * ) Notice: Subject to any disclaimer, the term of this patent is extended or adjusted under 35 U.S.C. 154(b) by 32 days.

(21) Appl. No.: 18/853,740

(22) PCT Filed: Mar. 31, 2023

(86) PCT No.: PCT/EP2023/058541

§ 371 (c)(1),
(2) Date: Oct. 3, 2024

(87) PCT Pub. No.: WO2023/198482

PCT Pub. Date: Oct. 19, 2023

(65) Prior Publication Data

US 2025/0233537 A1     Jul. 17, 2025

(30) Foreign Application Priority Data

Apr. 12, 2022    (EP) .................................... 22382349

(51) Int. Cl.
*H02P 9/10*            (2006.01)
*F03D 7/02*            (2006.01)
(Continued)

(52) U.S. Cl.
CPC ............ *H02P 9/102* (2013.01); *F03D 7/0224* (2013.01); *F03D 7/0264* (2013.01);
(Continued)

(58) Field of Classification Search
CPC .... F03D 7/0224; F03D 7/0264; F03D 7/0284; F03D 17/014; H02P 9/102;
(Continued)

(56) References Cited

U.S. PATENT DOCUMENTS 6,921,985 B2    7/2005  Janssen et al.
7,629,705 B2    12/2009  Barker et al.
(Continued)

FOREIGN PATENT DOCUMENTS

EP          2835529 B1    8/2016
KR      20130066327 A    6/2013

OTHER PUBLICATIONS

Machine translation of KR20130066327 (Year: 2013).*
PCT International Search Report and Written Opinion of International Searching Authority mailed Jun. 15, 2023 corresponding to PCT International Application No. PCT/EP2023/058541 filed Mar. 31, 2023.

*Primary Examiner* — Tulsidas C Patel
*Assistant Examiner* — Thomas K Quigley
(74) *Attorney, Agent, or Firm* — Schmeiser, Olsen & Watts, LLP

(57)    ABSTRACT

A method is provided for controlling the operation of a wind turbine, the wind turbine including a generator, a converter, a converter control unit, a wind turbine controller and a connection device to an external electrical power grid, wherein electrical power generated by the generator is input into the power grid via the converter, wherein the wind turbine controller is configured to determine a fault condition according to a fault condition signal and to active a safe operating mode in response to the fault condition signal indicating a fault condition, wherein the fault condition signal is determined by evaluating changes in an available (Continued)

output power signal generated by the converter control unit, the available output power signal describing the active output power available from the converter.

13 Claims, 4 Drawing Sheets

(51) Int. Cl.
    *F03D 17/00*       (2016.01)
    *H02P 101/15*     (2016.01)

(52) U.S. Cl.
    CPC ......... *F03D 7/0284* (2013.01); *F03D 17/014* (2023.08); *F05B 2260/80* (2013.01); *F05B 2270/1033* (2013.01); *F05B 2270/335* (2013.01); *H02P 2101/15* (2015.01)

(58) Field of Classification Search
    CPC ............. H02P 2101/15; F05B 2260/80; F05B 2270/1033; F05B 2270/335
    See application file for complete search history.

(56)          References Cited

U.S. PATENT DOCUMENTS

| | | | | |
|---|---|---|---|---|
| 8,106,567 B2 * | 1/2012 | Eichhorner | ........ | H05K 7/20172 |
| | | | | 310/317 |
| 8,335,656 B2 * | 12/2012 | Berger | .................... | H02H 3/44 |
| | | | | 702/183 |
| 8,874,424 B2 * | 10/2014 | Nielsen | ............... | H02J 3/00125 |
| | | | | 290/44 |
| 8,907,509 B2 * | 12/2014 | Brogan | ............... | H02M 5/4585 |
| | | | | 290/43 |
| 8,908,338 B2 * | 12/2014 | Kinsel | .................... | H02H 3/331 |
| | | | | 361/42 |
| 9,528,495 B2 * | 12/2016 | Lopez Rubio | ........ | F03D 7/0296 |
| 2012/0150524 A1 * | 6/2012 | Nielsen | .................... | H02J 3/381 |
| | | | | 290/44 |
| 2013/0235618 A1 * | 9/2013 | Dillig | .................... | H02H 7/1216 |
| | | | | 363/16 |
| 2015/0035281 A1 * | 2/2015 | Lopez Rubio | ........ | F03D 7/0224 |
| | | | | 290/44 |

* cited by examiner

METHOD FOR CONTROLLING THE OPERATION OF A WIND TURBINE AND WIND TURBINE

CROSS-REFERENCE TO RELATED APPLICATIONS

This application is a national stage of PCT Application No. PCT/EP2023/058541, having a filing date of Mar. 31, 2023, claiming priority to EP Application Serial No. 22382349.3, having a filing date of Apr. 12, 2022, the entire both contents of which are hereby incorporated by reference.

FIELD OF TECHNOLOGY

The following relates to a method for controlling the operation of a wind turbine, the wind turbine comprising a generator, a converter, a converter control unit, a wind turbine controller and a connection device to an external electrical power grid, wherein electrical power generated by the generator is input into the power grid via the converter, wherein the wind turbine controller is configured to determine a fault condition according to a fault condition signal and to activate a safe operating mode in response to the fault condition signal indicating a fault condition. The invention further relates to a wind turbine.

BACKGROUND

Wind turbines for power generation usually comprise a generator for converting mechanical power provided by a rotor having wind turbine blades into electrical power, which may be input into an external electrical power grid, to which the wind turbine is connected. The wind turbine blades are usually connected to a rotor hub, and the so-formed rotor is connected to the generator via a drive train. Since the external electrical power grid has certain requirements regarding electrical power to be input, for example regarding voltage, frequency and/or phases, the wind turbine usually comprises a converter for converting the electrical AC power of varying frequency and strength into electrical AC power suitable to be input into the external electrical power grid.

Here, numerous fault conditions are conceivable which might lead to critical conditions in components of the wind turbine, which may, in particular, also cause damage to components, such that it has been proposed to shut down wind turbine operation for some fault conditions. However, operators of external electrical power grids often require wind turbines to withstand at least some of those fault conditions without shutting down. In embodiments, power grid interconnection standards are defined, which include requirements imposed on power suppliers and large power consumers.

An example for such a fault condition is a voltage dip in the electrical power grid, that is, the voltage in the electrical power grid dropping to certain lower levels, for example 15%, or even zero. Here, a so-called "low voltage ride through" is often required. In case of a voltage dip, the wind turbine must remain functional, connected and synchronized to the electrical power grid instead of shutting down/going offline. To allow the wind turbine to stay online and to prevent damage to wind turbine components during a voltage dip, different approaches have already been discussed in the art.

For example, in U.S. Pat. No. 6,921,985 B2, techniques are described to allow a wind turbine generator to remain synchronized to the power grid during severe voltage fluctuations, to maintain functioning of the blade pitch system in spite of lack of voltage at the generator terminals, to protect the power converter and generator from high voltages and currents during the voltage fluctuation, to temporarily shut down non-vital sub-systems that could be damaged by exposure to low voltages or could be tripped by either circuit breaker action or fuse operation. Here, it is proposed to use an uninterruptable power supply coupled to the turbine controller and with the blade pitch control system to provide power during a low voltage event, wherein the turbine controller causes the blade pitch control system to control, in particular vary, the pitch of the one or more blades in response to the detection of such an event.

In EP 2 835 529 B1, smart power management during a voltage dip in wind turbines is discussed. Here, a method of reducing mechanical load during a voltage dip in a wind turbine is proposed, wherein the wind turbine controller and the converter control unit work in combination to control the oscillation generated due to the voltage dip in the wind turbine. An optimized pitch reference is applied to minimize oscillations, avoid overspeed values, and keep aerodynamic torque enough to recover power production in a short time when the grid recovers. Additionally, a controlled ramped power reference with different rates and filters is applied if needed to reduce the torque overshoot when recovering from the voltage dip, fulfilling the settling time requirements and integrating in the best way the drive train damper action (DTD action). Here, the wind turbine controller receives information from the converter control unit to know that a voltage dip is taking place.

However, other fault conditions may also occur in the wind turbine, for example component faults or malfunctions, high temperature conditions, and partial failures.

It is noted that converters comprising multiple independent converter assemblies to provide different channels, for example in a so-called multi stator set-up, have also been proposed. For example, in KR 2013 0066327 A, a wind power generation system capable of multiplexing control of power converters is described, wherein a plurality of parallel converter assemblies is provided. When some of the power converters fail, they can be deactivated and the wind turbine operation can be continued with the remaining converter assemblies. To determine which converter assembly fails, the output value of each power converter assembly may be checked.

SUMMARY

An aspect of the current invention allows improved fault condition detecting and handling in a wind turbine.

In a first aspect, a method for controlling the operation of a wind turbine is provided. According to embodiments of the invention, the fault condition signal is determined by evaluating changes in an available output power signal generated by the converter control unit, the available power output signal describing the active output power available from the converter.

It is hence proposed to not use a signal indicating a voltage dip in the external electrical power grid, but instead base fault condition detection onto the change of available power in the converter. That is, in particular abrupt, changes in the active output power of the converter are detected, wherein, if a relevant change, for example characterized by a gradient threshold and/or a threshold for the absolute power difference, is detected, a fault condition signal is set to indicating a fault condition, for example to "true" or "1".

Hence, the fault condition signal is a Boolean signal, such that a respective bit in the wind turbine controller may be set. While known Boolean signals for voltage dips or signals with information about the voltage in the power grid indicate voltage dips as fault conditions, the here proposed fault condition signal additionally is able to indicate other, additional fault conditions, not only voltage dips in the external electrical power grid.

Since abrupt changes in the active output power available at the converter are detected, the fault condition signal can also be named "torque mismatch" signal, since a torque mismatch is described. A torque mismatch may occur due to a low voltage event in the power grid (voltage dip), but also when a high voltage event takes place, for example a voltage increase in the external electrical power grid by more than 15%. Other causes for abrupt changes in available output power comprise component faults or malfunctions, power derating due to high temperature, and a partial failure in a power converter module.

The available output power signal is provided by the converter control unit (CCU). Since this is already provided in known converter control units of the conventional art, in particular when converter control is based on power, no modification of the converter control unit is required. In an embodiment, the fault condition signal is determined in the wind turbine controller, which may be or comprise the wind turbine generator control device. In an embodiment, the wind turbine controller may be a programmable logic circuit (PLC).

The available power output signal specifies the active power that the power converter is able to produce, taking into account electrical conditions or restrictions. For example, available active output power may be understood as normally rated power plus auxiliary consumption and losses outside a fault condition. When a fault condition occurs, for example a voltage drop in the power grid, a high voltage event in the power grid, a grid frequency event, high temperature in a component or a partial power converter failure, the available active output power and hence the available output power signal drops in value to the maximum that the power converter can produce in those circumstances, that is, in the fault condition. If a fault condition is indicated by the fault condition signal, the wind turbine controller activates a special safe operating mode, wherein the wind turbine, especially particular components, are protected, such that a proper wind turbine control response is affected and the wind turbine can be kept online.

In an embodiment, the wind turbine controller may return to a previous operating mode, in particular a default operating mode, if the fault condition signal changes from indicating a fault condition to not indicating a fault condition. That is, the end of the fault condition, for example dropping temperature, restoration of the nominal grid voltage and the like, can also be detected evaluating the available power output signal. In embodiments, if the previous maximum producible power of the power converter is recovered, the end of the fault condition may be detected.

In summary, abrupt changes in the available output power in the converter are detected by evaluating the available output power signal from the converter control unit, in the wind turbine controller. A new signal indicating these changes, that is, a torque mismatch, is used as fault condition signal instead of using signals indicating voltage dips or signals containing information about the voltage in the external electrical power grid, in particular measured at the generator terminals. The newly proposed fault condition signal not only concerns voltage dips as fault condition, but also other situations, such that proper control measures to improve the wind turbine control response can be actuated. In embodiments, a corresponding safe operating mode is activated in the wind turbine to protect components during the oscillations caused by abrupt changes of the available output power in the converter and/or to prevent such oscillations at least partly. Since additional fault conditions are detected, better protection of the wind turbine components is achieved.

Here, of course, the available output power refers to the converter as a whole, even if the converter comprises multiple partial converter assemblies, in particular in a multi-channel arrangement. Hence, total available converter output power is analyzed, also covering the detection of voltage dips in the grid. For detecting faulty converter channels in a multiplexing control, different, additional steps may be employed. In other words, the available output power is the total available output power of at least one power converter assembly of the one single converter of the wind turbine. As a fault condition, at least a voltage dip in the grid is detectable.

In some examples, the fault condition signal is determined in the wind turbine controller based on the available output power signal sent by the converter control unit, as already discussed.

In an embodiment, the available output power signal may be received by the wind turbine controller and a Boolean power change signal indicating the presence of a drop or increase in the available output power may be determined from the available output power signal in the wind turbine controller, wherein the fault condition signal is set to indicating a fault condition if the power change signal changes from false to true. Hence, a power change signal having the value "true" if an, in particular abrupt, power change is detected can be derived from the available output power signal to provide an indication of a power drop or increase that is easy to process. Since the power change signal is determined in the wind turbine controller, no modification of the converter control unit is necessary. On the other hand, the wind turbine controller, which may be a PLC, comprises software and/or at least programmable hardware components, which can easily be provided and/or modified to determine the power change signal.

In some examples, in this context, also a Boolean recovery signal indicating that a recovery from the drop or increase in the available output power is determined from the available output power signal in the wind turbine controller, wherein the fault condition signal is set to indicating no fault condition when the recovery signal changes from false to true. Hence, a second signal, namely the recovery signal, which is also Boolean, can be derived from the available output power signal and indicates that active output power available from the converter recovers from the power dip and/or power peak. If the recovery signal changes from false to true, recovery is indicated and it can be safely assumed that the fault condition is no longer present. Here, the same advantages as regarding the power change signal apply.

It should be noted at this point that embodiments are conceivable in which the recovery signal can simply be determined as the inverse of the power change signal (NOT power change signal). It is, as further discussed below, however preferred to derive the power change signal and the recovery signal in a different manner to optimize detection of an, in particular abrupt, power change and respective recovery.

In an example, the power change signal and/or the recovery signal may be determined from at least one filtered signal, wherein the at least one filtered signal is determined by filtering using a smoothing filter, wherein the power change signal and/or the recovery signal are determined by comparing a respective of the at least one filtered signal with a respective threshold value.

In embodiments, for comparing a filtered signal with a respective threshold value, the absolute value (magnitude) of the respective filtered signal may be used. In embodiments, simple mathematical operations, which are easy to implement, are employed to determine a filtered signal, from which the required information can be easily derived by a simple comparison with a threshold. For example, regarding the power change signal, the threshold may define a relevant change and/or speed of change (gradient) in the available output power of the converter, such that a fault condition can be assumed. Such a parameter may be stored in the wind turbine controller, for example as a drop limit threshold. Regarding recovery, it may be detected whether the available output power signal and hence the available output power is returning to normal, which can, again, be described by a threshold, for example a parameter which may be named recovery limit and also be stored in the wind turbine controller.

The filter has at least a smoothing effect such that high frequency events do not lead to erroneous fault condition or recovery detection. In an embodiment, the smoothing filter may comprise at least one low-pass filter.

In an embodiment, the at least one filtered signal may be normalized, e.g., by a per-unit transformation, and/or, for instance in case of a frequency dependent processing, converted to absolute values before threshold comparison. Applying a per-unit transformation (pu transformation) allows to apply thresholds which are suitable for each situation, in particular as per-unit thresholds. Hence, comparison is facilitated. In some examples, normalization may also occur before applying the smoothing filter.

In an embodiment, before filtering, frequency dependent processing of the available output power signal may be performed, in particular emphasizing changes and/or variations on a predetermined time scale, and the smoothing filter may be applied to the result. If a frequency dependent processing, for example differentiation operation d/dt or a change and/or variation emphasis, is performed, noise may be added to the signals, which may be smoothed out by the following filtering step.

The frequency dependent processing emphasizes changes and/or variations of the available output power signal on a predetermined time scale, that is, in a certain frequency interval. In this manner, very slow changes and/or variations and/or very fast changes, for example due to noise, are, on the other hand, suppressed. In some embodiments, two different low pass filters may be applied and the results subtracted. In embodiments, the result of a "slower" low pass filter, i.e., having a lower cutoff frequency than the other low pass filter, may be subtracted from the result of the other low pass filter. Instead of low pass filters, slew limiters may also be used.

In an embodiment, a first filtered signal may be determined for the power change signal and a second filtered signal may be determined for the recovery signal by applying different smoothing filters and/or frequency dependent processing. The smoothing filters and/or processing units used in the frequency dependent processing are chosen to optimize detectability of features indicating the respective event, that is, power change (in particular power drop) and recovery. In this manner, robust and reliable detection of fault conditions and their end can be implemented.

In an embodiment, the safe operating mode may comprise at least one measure for reducing the occurrence of mechanical load due to the fault condition. Furthermore, measures for reducing electrical load, for example preventing excess voltages and/or excess currents, may be provided in the safe operating mode. In this manner, the wind turbine may remain online while components are protected from damage. For example, such measures may comprise activating an uninterruptable power supply, choosing a suitable pitch angle for the blades, deactivating electrical components which are not required in the safe operating mode, and the like.

In embodiments, measures such as described in EP 2 835 529 B1 may be employed.

In an embodiment, the at least one measure may comprise commanding to move the pitch angle of the blades towards feather position with a specific rate, delivering a maximum active power generation value by the converter control unit to the wind turbine controller after the available output power recovers, setting a saturation value of the set points for the drive train to assure a correct drive train damper (DTD) action application, the saturation value set by the converter control unit depending on the maximum active power, ramping up the power or torque set points with different rates according to the DTD action to come up with a ramped value of the power taking into account network operator's settling time restrictions, applying a first order filter to the ramped value of the power to soften more the torque overshoot, and applying the drive train damper torque command to the ramped power reference in order to reduce the mechanical load in the wind turbine and to damp the oscillation in the wind turbine generator.

For further details regarding these measures, it is referred to EP 2 835 529 B1.

In a further aspect, a wind turbine is provided. The wind turbine comprising a generator, a converter, a converter control unit, a wind turbine controller and a connection device to an external electrical power grid, wherein electrical power generated by the generator is input into the power grid via the converter, wherein the wind turbine controller is configured to determine a fault condition according to a fault condition signal and to activate a safe operating mode in response to the fault condition signal indicating a fault condition, wherein the wind turbine controller is further configured to receive an available output power signal generated by the converter control unit, the available output power signal describing the active output power available from the converter, and determine the fault condition signal from the available power output signal.

All features and remarks regarding the method according to embodiments of the invention analogously apply to the wind turbine according to embodiments of the invention and vice versa.

BRIEF DESCRIPTION

Some of the embodiments will be described in detail, with reference to the following figures, wherein like designations denote like members, wherein.

DETAILED DESCRIPTION

Figure 1:
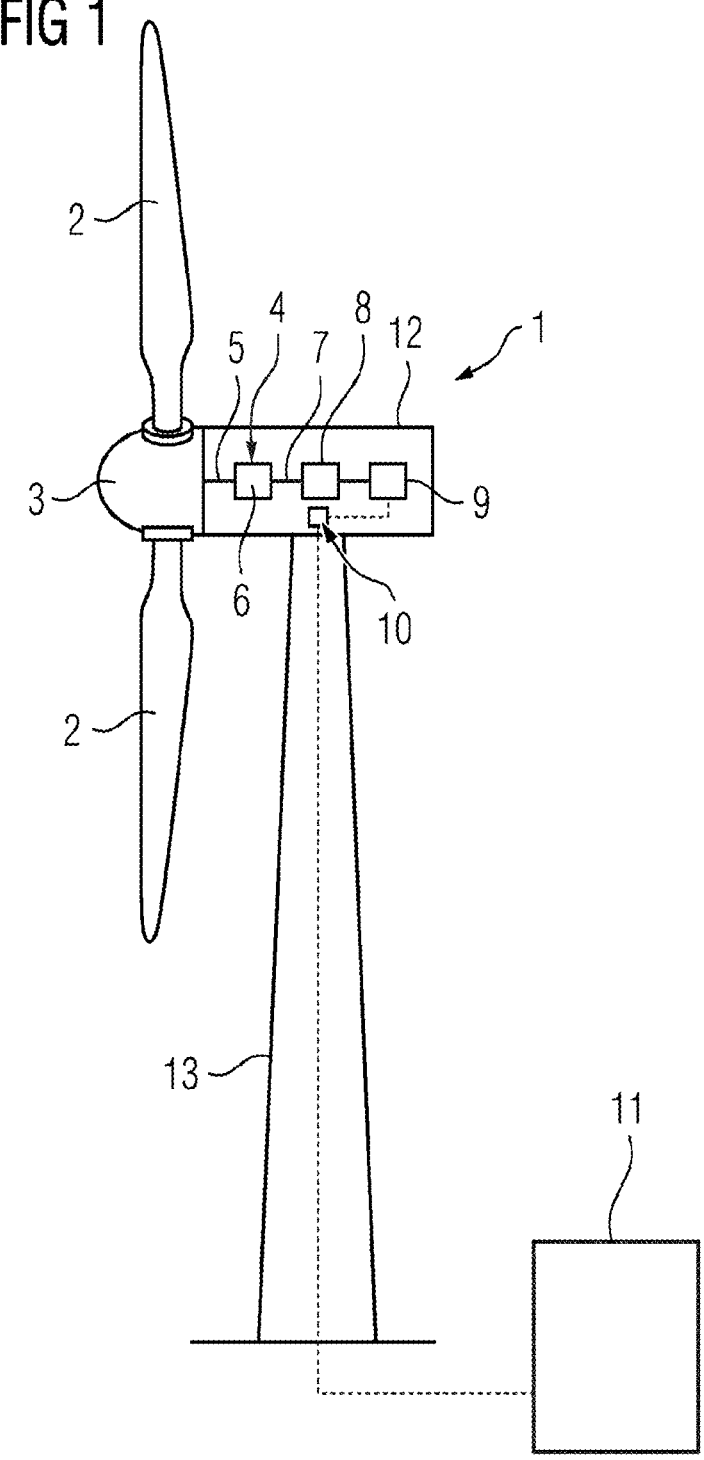
FIG. 1 shows a schematical view of a wind turbine according to the invention.

FIG. 1 is a schematical view of a wind turbine 1 according to embodiments of the invention. The wind turbine 1 comprises a rotor having, in this case, three wind turbine blades 2 attached to a rotor hub 3. The rotor is connected to a drive train 4 comprising a rotor shaft 5, a gear box 6, a generator shaft 7 and a wind turbine generator 8, which may be coupled to the generator shaft 7 via a coupling (not shown).

If wind impinges on the wind turbine blades 2 along the rotational axis of the rotor, the rotor begins to rotate such that mechanical power is input to the generator 8. The generator 8 converts the mechanical power into electrical power, which is fed to a converter 9 converting it into electrical power fulfilling requirements to be input via a connection device 10 (only indicated in FIG. 1) into an external electrical power grid 11 (only indicated in FIG. 1).

In the wind turbine of FIG. 1, the drive train components as well as the converter 9 are housed in a nacelle 12, which is pivotably carried by a tower 13 of the wind turbine 1. The wind turbine 1 may be an offshore wind turbine or an onshore wind turbine.

Figure 2:
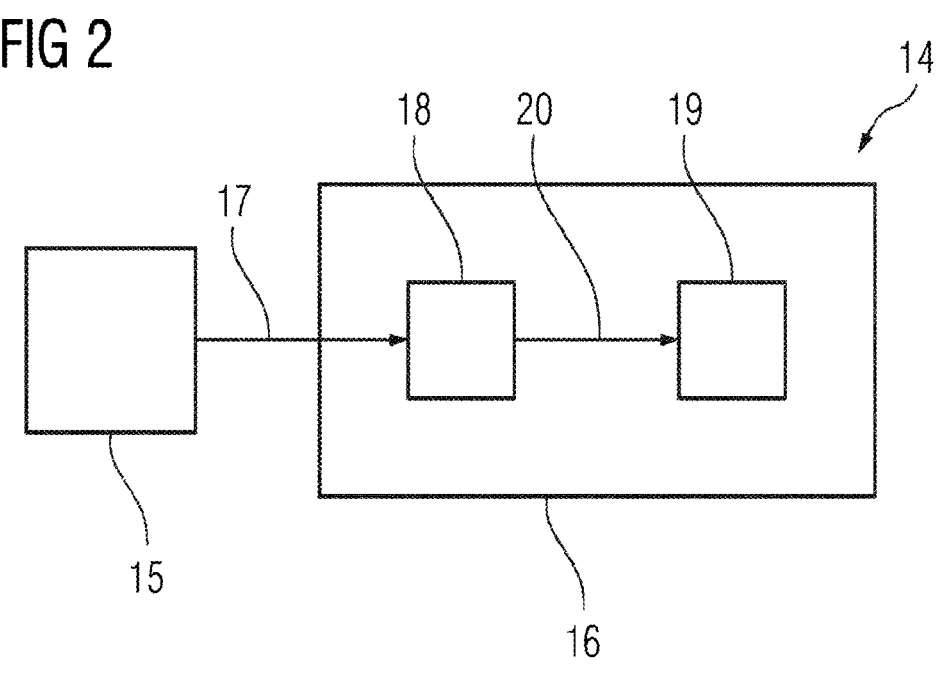
FIG. 2 shows a schematical view of the control structure of the wind turbine according to an example.

The wind turbine 1 may further comprise a control system 14 shown in FIG. 2. The control system 14 may comprise a converter control unit 15 (CCU) and a wind turbine controller 16, which may, for example, be implemented as a PLC. The wind turbine controller 16 may also be called wind turbine generator control device or wind turbine generator (WTG) controller. The wind turbine controller 16 controls operation of the wind turbine 1. It receives input from the converter control unit 15 and sends control signals to the converter control 15 and other components, for example a pitch system (not shown), an uninterruptable power supply (not shown), and the like. According to embodiments of the invention, the wind turbine controller 16, in particular, receives an available output power signal according to arrow 17 from the converter control unit 15. In an evaluation unit 18 of the wind turbine control unit 16, a Boolean fault condition signal may be derived from the available output power signal and provided to an operation control unit 19 according to arrow 20.

The available output power signal describes the active output power available in the converter 9. The fault condition signal may indicate various types of fault conditions relating to the occurrence a torque mismatch and can hence also be called torque mismatch signal. The fault condition signal may in particular indicate at least the following types of fault conditions, namely a low voltage or high voltage event (voltage dip or voltage peak) of the external electrical power grid 11, a frequency event of the external electrical power grid 11, a high temperature event in the component of the wind turbine 1 leading to power derating, and a partial failure of the power converter 9, in particular failure in a power converter module. While the available active output power of the converter 9 is normally the rated power plus auxiliary consumptions and losses, in case of a fault condition, the signal drops its value to the maximum that the converter 9 can produce under the circumstances of the fault condition.

If the fault condition signal indicates a fault condition ("true"), the operating control unit 19 may change the operating mode from a default or normal operating mode to a special safe operating mode to protect components of the wind turbine 1. In embodiments, measures for protecting components from mechanical load can be effected, like adjusting a pitch angle of the wind turbine blades 2, in particular to a feather position. Furthermore, an uninterruptable power supply can be activated and the like. In embodiments, measures like those described in EP 2 835 529 B1 can be used.

Figure 3:
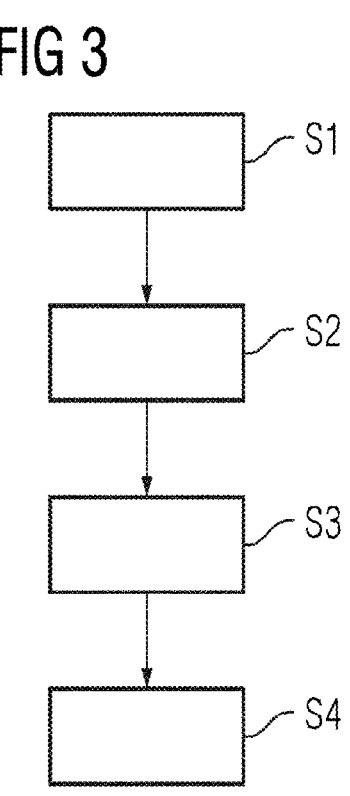
FIG. 3 shows a flow chart of an embodiment of a method according to the invention.

The wind turbine controller 16 is hence configured to perform a method according to embodiments of the invention. An embodiment of such a method will now be discussed with respect to FIGS. 3 to 6. Here, FIG. 3 is a general flow chart of the method.

In a step S1, the wind turbine controller 16 may receive the available output power signal from the converter control unit 15. In a step S2, two further signals may be derived from the available output power signal, namely a power change signal indicating the presence of an, in particular abrupt, power change which marks the beginning of a fault condition, and a recovery signal indicating the return of the dropped available active output power to its normal value (as discussed above, normally rated power plus auxiliary consumptions and losses). The power change signal and the recovery signal may be evaluated in step S3 to determine the fault condition signal. In embodiments, if the power change signal indicates a power change, that is, flips from false to true while the fault condition signal is false, the fault condition signal is set to true, indicating a fault condition. If the false condition signal is true and the recovery signal switches from false to true, indicating recovery, a fault condition signal is set to false once again.

In a step S4, a safe operating mode may be activated if the fault condition signal changes from false to true, and a return to the previous, in particular default, operating mode is initiated when the fault condition signal changes from true to false.

Figure 4:
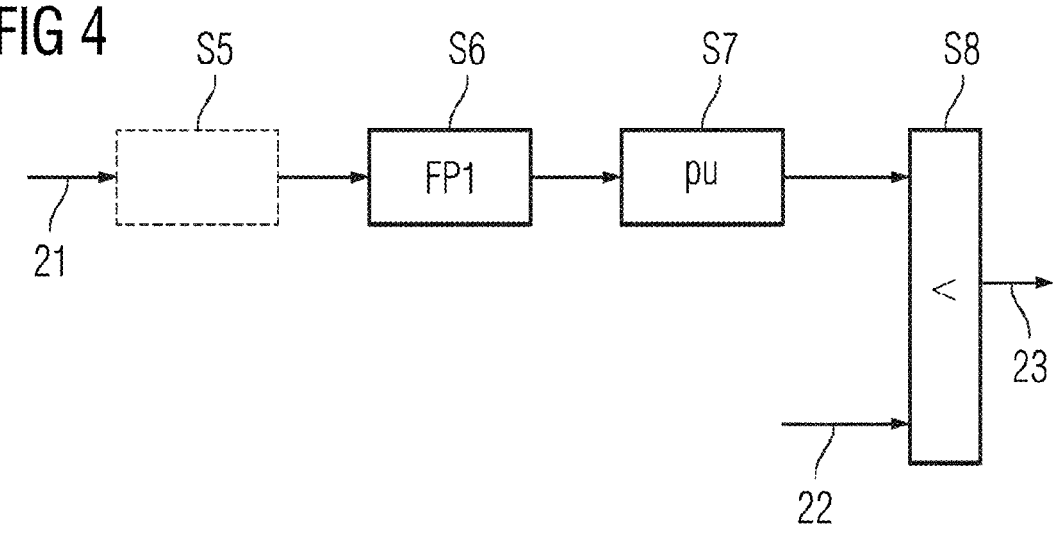
FIG. 4 shows a flow chart for determining a power change signal according to an embodiment.

FIG. 4 shows the determination of the power change signal. As indicated by arrow 21, the available output power signal is provided by the converter control unit 15. In an optional step S5, changes and/or variations of the available output power signal in a predetermined time scale are emphasized by frequency-dependent processing. In concrete embodiments, two low pass filters may be used, one having a lower cutoff frequency and thus being "slower". The result of the one filter may be subtracted from the result of the other low pass filter. Instead of low pass filters, slew limiters may also be used.

In a step S6, a smoothing filter FP1 may be applied to the available output power signal or the result output in step S5, if processed. The smoothing filter decreases noise introduced by the change and/or variation emphasis operation in step S5, if performed, as well as other high-frequency fluctuations already present in the available output power signal.

In a step S7, a per-unit transformation may be applied to the filtered signal, which may then be forwarded to step S8, where the filtered signal may be compared to a per-unit threshold, in this case per-unit drop limit provided according to arrow 22, wherein the power change signal is output as false as long as the per-unit filtered signal is larger than the per-unit threshold, and else as true, according to arrow 23.

Steps S6 and S7 may also be applied in the opposite order, i.e., performing the per-unit transformation first and then applying the smoothing filter.

Figure 5:
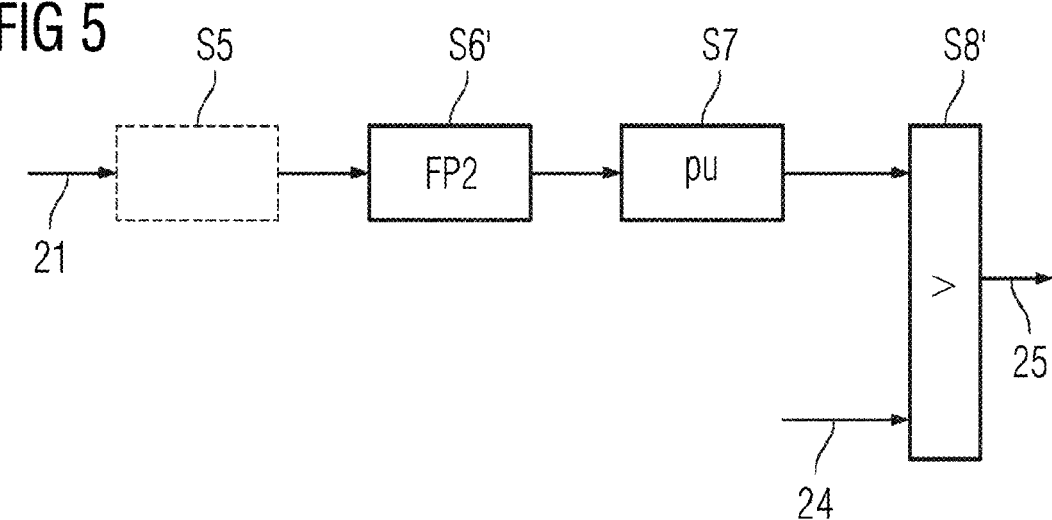
FIG. 5 shows a flow chart for determining a recovery signal according to an embodiment.

FIG. 5 shows the determination of the recovery signal, which may follow the same general structure. The main difference is modified step S6', where a different smoothing filter FP2 may be used. The smoothing filters FP1 and FP2, which may comprise at least one low-pass filter, are chosen to optimize the detectability of the features determining the presence of a power change and recovery, respectively. In some embodiments, step S5 may also be replaced by a step S5', to apply a change and/or variation emphasis optimized regarding recovery detection.

In modified step S8', the second per-unit filtered signal may be compared to a different per-unit threshold supplied according to arrow 24, wherein, if the per-unit filtered signal is larger than the per-unit threshold, in this case a per-unit recovery limit, the recovery signal is output as true and else as false, as indicated by arrow 25.

Figure 6:
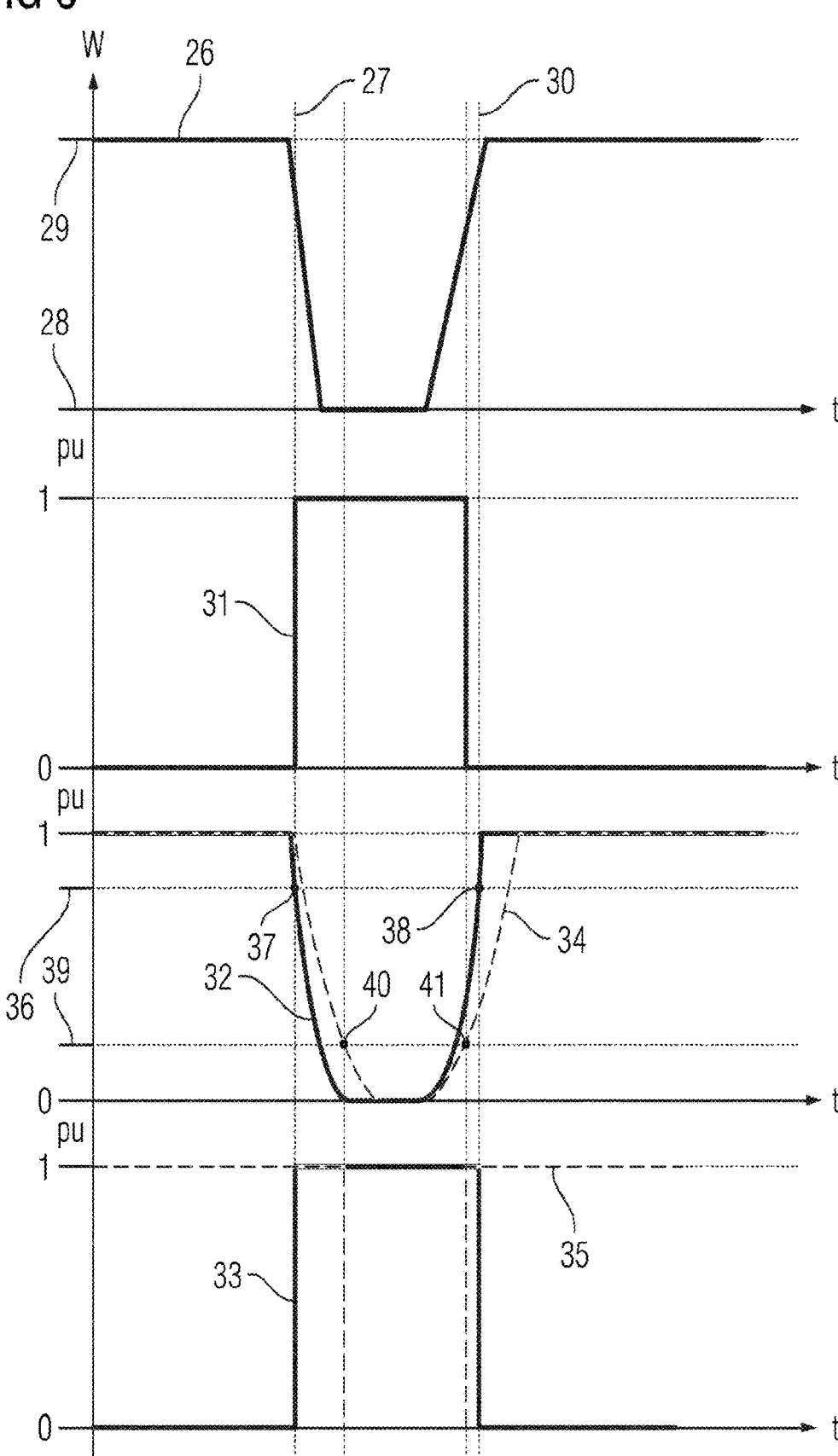
FIG. 6 shows graphs illustrating principles of the current invention according to an embodiment.

FIG. 6 illustrates this principle exemplarily for a simplified available output power signal 26 shown in the uppermost graph. At a time shortly before time point 27, the available output power W begins to drop to a lower value 28 and recovers at a later time to again reach its normal value 29 at time point 30.

The second graph shows the corresponding fault condition signal 31, while the third and the fourth graph explain the determination of the fault condition signal 31. In the third graph, the corresponding first per-unit filtered signal 32 for the power change signal 33 in the fourth graph is shown, as well as the second per-unit filtered signal 34 for the recovery signal 35 shown in the fourth graph. As can be seen, the power change signal 33 is set to true (1) once the first per-unit filtered signal 32 drops below a first per-unit threshold 36 and is again set to false (0) as the first per-unit filtered signal 32 again exceeds the first per-unit threshold 36, see points 37, 38. Likewise, the recovery signal 35 is set to false, that is 0, as soon as the second per-unit filtered signal 34 drops below a second per-unit threshold 39 and again set to 1, that is true, as the second per-unit filtered signal 34 exceeds the second per-unit threshold 39, see points 40, 41.

That is, at point 37, while the fault condition signal is false, the power change signal 33 changes from false to true, such that the fault condition signal 31 also changes from false to true. At point 41, recovery signal 35 changes from false to true while the fault condition signal 31 is true, such that the fault condition signal 31 is again set to false.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for controlling the operation of a wind turbine, the wind turbine comprising a generator, a converter, a converter control unit, a wind turbine controller and a connection device to an external electrical power grid, wherein electrical power generated by the generator is input into the external electrical power grid via the converter, said method comprising:

determining by the wind turbine controller, a fault condition signal by evaluating changes in an available output power signal generated by the converter control unit, wherein the available output power signal describes an active output power available from the converter, and wherein the wind turbine controller and the converter control unit are different devices;

receiving, by the wind turbine controller, the available output power signal sent by the converter control unit to the wind turbine controller;

determining, by the wind turbine controller, a fault condition indicated by the fault condition signal; and activating, by the wind turbine controller, a safe operating mode in response to the fault condition signal indicating the fault condition.

2. The method according to claim 1, wherein the available output power signal is received by the wind turbine controller and a Boolean power change signal indicating the presence of a drop or increase in the available output power is determined from the available output power signal in the wind turbine controller, wherein the fault condition signal is set to indicating a fault condition if the power change signal changes from false to true.

3. The method according to claim 2, wherein a Boolean recovery signal indicating a recovery from the drop or increase in the available output power is determined from the available output power signal in the wind turbine controller, wherein the fault condition signal is set to indicating no fault condition when the recovery signal changes from false to true.

4. The method according to claim 3, wherein the power change signal and/or the recovery signal are determined from at least one filtered signal, wherein the at least one filtered signal is determined by filtering using a smoothing filter, wherein the power change signal and/or the recovery signal are determined by comparing a respective of the at least one filtered signal with a respective threshold value.

5. The method according to claim 4, wherein the at least one filtered signal is normalized, by a per-unit transformation.

6. The method according to claim 4, wherein, before filtering, frequency dependent processing of the available output power signal is performed, emphasizing changes and/or variations on a predetermined time scale.

7. The method according to claim 4, wherein a first filtered signal is determined for the power change signal and a second filtered signal is determined for the recovery signal by applying different smoothing filters.

8. The method according to claim 1, wherein the safe operating mode comprises at least one measure for reducing a mechanical load in the wind turbine due to the fault condition.

9. The method according to claim 8, wherein the at least one measure comprises:

commanding to move a pitch angle of the blades towards feather position with a specific rate, delivering a maximum active power generation value of power by the converter control unit to the wind turbine controller after the available output power recovers, setting a saturation value of set points for a drive train to assure a correct drive train damper action application, the saturation value set by the converter control unit depending on the maximum active power generation value, ramping up the maximum active power generation value of power or the torque set points for the drive train with different rates according to the drive train damper action application to come up with a ramped value of the power taking into account a network operator's settling time restrictions, applying a first order filter to the ramped value of the power to soften a torque overshoot during recovery from a voltage dip in the external electrical power grid, and applying a drive train damper torque command to the ramped value of power to reduce the mechanical load in the wind turbine and to damp an oscillation in the generator.

10. The method according to claim 1, wherein the available output power is the total available output power of at least one power converter assembly of the converter of the wind turbine.

11. A wind turbine, comprising a generator, a converter, a converter control unit, a wind turbine controller and a connection device to an external electrical power grid, wherein electrical power generated by the generator is input into the power grid via the converter, wherein the wind turbine controller is configured to:

determine a fault condition signal by evaluating changes in an available output power signal generated by the converter control unit, wherein the available output power signal describes an active output power available from the converter, and wherein the wind turbine controller and the converter control unit are different devices;

receive the available output power signal sent by the converter control unit to the wind turbine controller;

determine a fault condition indicated by the fault condition signal; and activate a safe operating mode in response to the fault condition signal indicating the fault condition.

12. The method according to claim 1, wherein the fault condition indicated by the fault condition signal comprises a high power event in the external electrical power grid, a frequency event in the external electrical power grid, a high temperature event in a component of the wind turbine leading to power derating, or a partial failure in a power converter module in the converter.

13. The wind turbine according to claim 11, wherein the fault condition indicated by the fault condition signal comprises a high power event in the external electrical power grid, a frequency event in the external electrical power grid, a high temperature event in a component of the wind turbine leading to power derating, or a partial failure in a power converter module in the converter.

* * * * *